(12) United States Patent
Jansen

(10) Patent No.: US 9,635,839 B2
(45) Date of Patent: May 2, 2017

(54) DEVICE AND METHOD FOR FACILITATING PLACING OF POULTRY IN CONTAINERS

(71) Applicant: A.H. Jansen Holding B.V., Barneveld (NL)

(72) Inventor: Albrecht Hendrik Jansen, Barneveld (NL)

(73) Assignee: A.H. Jansen Holding B.V., Barneveld (NL)

( * ) Notice: Subject to any disclaimer, the term of this patent is extended or adjusted under 35 U.S.C. 154(b) by 0 days.

(21) Appl. No.: 14/912,634

(22) PCT Filed: Aug. 19, 2014

(86) PCT No.: PCT/NL2014/050567
§ 371 (c)(1),
(2) Date: Feb. 18, 2016

(87) PCT Pub. No.: WO2015/026232
PCT Pub. Date: Feb. 26, 2015

(65) Prior Publication Data
US 2016/0198686 A1 Jul. 14, 2016

(30) Foreign Application Priority Data

Aug. 19, 2013 (NL) ...................................... 2011316
May 15, 2014 (NL) ...................................... 2012821

(51) Int. Cl.
*B65G 1/06* (2006.01)
*B65G 15/00* (2006.01)
(Continued)

(52) U.S. Cl.
CPC .......... *A01K 45/005* (2013.01); *A01K 31/002* (2013.01); *B65B 35/10* (2013.01);
(Continued)

(58) Field of Classification Search
CPC .... A01K 45/005; A01K 31/002; B65B 43/54; B65B 35/10; B65G 47/74; B65G 15/00; B65G 47/54; B65G 1/06; B65G 21/00
(Continued)

(56) References Cited

U.S. PATENT DOCUMENTS 1,999,526 A * 4/1935 Mudd .................. A01K 31/002
119/401
3,110,388 A 11/1963 Elliott et al.
(Continued)

FOREIGN PATENT DOCUMENTS

CA 2736731 A1 10/2012
DE 2413390 A 9/1975
NL 2000972 C2 5/2009

*Primary Examiner* — Mark A Deuble
(74) *Attorney, Agent, or Firm* — The Webb Law Firm

(57) ABSTRACT

A device for facilitating the placing of poultry animals supplied on at least one poultry conveyor into containers is provided with a frame, a number of first platforms mounted on the frame and extending horizontally at a first level for the purpose of carrying a container for each of the poultry conveyors. Each first platform is located at the end of a poultry conveyor. At least a first discharge transport element is mounted on the frame at the first level and extending transversely of the poultry conveyors and situated on the side of the platforms facing away from the poultry conveyor for the purpose of carrying away containers filled with poultry. A first connecting element extends between the first discharge transport element and each of the first platforms and mounted on the frame for the purpose of transporting containers filled with poultry between the relevant platform and the discharge transport element. The invention also relates to a method.

18 Claims, 5 Drawing Sheets

(51) Int. Cl.
*A01K 45/00* (2006.01)
*A01K 31/00* (2006.01)
*B65B 35/10* (2006.01)
*B65B 43/54* (2006.01)
*B65G 47/74* (2006.01)

(52) U.S. Cl.
CPC ............... *B65B 43/54* (2013.01); *B65G 1/06* (2013.01); *B65G 15/00* (2013.01); *B65G 47/74* (2013.01)

(58) Field of Classification Search
USPC .......................................................... 198/346
See application file for complete search history.

(56) References Cited

U.S. PATENT DOCUMENTS

| | | | | |
|---|---|---|---|---|
| 4,658,947 | A * | 4/1987 | Welder | B65G 47/54 198/346.2 |
| 5,325,953 | A * | 7/1994 | Doster | B65G 43/08 198/304 |
| 6,109,215 | A * | 8/2000 | Jerome | A01K 45/005 119/843 |
| 9,119,382 | B2 * | 9/2015 | Foreman | A01K 45/005 |
| 2002/0098066 | A1 * | 7/2002 | Sinn | A01K 45/005 414/345 |
| 2003/0138312 | A1 * | 7/2003 | Watson | B65G 59/00 414/795.4 |
| 2013/0125835 | A1 * | 5/2013 | Sinn | A01K 45/005 119/840 |
| 2014/0283755 | A1 * | 9/2014 | Zanotti | A01K 45/005 119/489 |

* cited by examiner

DEVICE AND METHOD FOR FACILITATING PLACING OF POULTRY IN CONTAINERS

CROSS-REFERENCE TO RELATED APPLICATIONS

This application is the United States national phase of International Application No. PCT/NL2014/050567 filed Aug. 19, 2014, and claims priority to Netherlands Patent Application Nos. 2011316 and 2012821, filed Aug. 19, 2013 and May 15, 2014, respectively, the disclosures of which are hereby incorporated in their entirety by reference.

BACKGROUND OF THE INVENTION

Field of the Invention

The invention relates to a device for facilitating placing of poultry in containers, wherein the poultry animals are supplied on a poultry conveyor.

Description of Related Art

Poultry is usually accommodated in coops arranged adjacently of each other in series, the bottom thereof having a permeable structure. A conveyor belt usually extends under the bottom of the series of coops for the purpose of discharging the manure which has been produced by the poultry and has fallen through the bottom. This conveyor belt can also be used to transport the poultry to a loading station placed at an end of the series of coops, for which purpose the bottoms are removed from the coops and the poultry animals drop onto the conveyor belt, which is referred to in the context of this document as poultry conveyor. Such a coop structure is known as the so-called 'Bromax' system marketed by Jansen Poultry. At the position of the loading station at the end of the series of poultry coops the poultry animals are taken from the end of the poultry conveyor by hand and loaded one by one up to a desired number into a container, usually in the form of a crate, in which the poultry animals are transported to the slaughterhouse.

SUMMARY OF THE INVENTION

In order to facilitate the work of the person picking up and placing the animals in the containers, the present invention provides a device for facilitating the placing of poultry animals in containers, wherein the poultry animals are supplied on at least one poultry conveyor, wherein the device is provided with a frame, a number of first platforms mounted on the frame and extending horizontally at a first level for the purpose of carrying a container for each of the poultry conveyors, wherein each first platform is located in the vicinity of the end of a poultry conveyor, at least a first discharge transport element mounted on the frame at the first level and extending transversely of the poultry conveyors in the operative position of the device for the purpose of carrying away containers filled with poultry, which element is situated on the side of the platforms facing away from the poultry conveyor, and first connecting elements extending between the first discharge transport element and each of the first platforms and mounted on the frame for the purpose of transporting containers filled with poultry between the relevant platform and the discharge transport element.

This device makes it possible to separate handling of the poultry from handling of the containers, since the containers filled with poultry can be carried away in simple manner from the loading position on the platform via the connecting element and the discharge transport element.

The invention likewise relates to a method for placing poultry animals supplied on at least one poultry conveyor into containers, wherein the method comprises the steps of placing an empty container, in which a number of poultry animals have to be placed, on a platform mounted in the vicinity of the poultry conveyor, removing the number of poultry animals from the poultry conveyor and placing these poultry animals into the container, displacing the container filled with poultry animals over a connecting element onto a discharge transport element and moving the container filled with poultry animals over the discharge transport element to an unloading station in a direction extending substantially perpendicularly of the direction in which the container is moved over the connecting element.

As already elucidated, the above stated measures relate only to the discharge of the containers filled with poultry. In order to further simplify operations a preferred embodiment provides means for supplying the empty containers. According to this embodiment the device also comprises a feed transport element mounted on the frame above the first level and extending transversely of the poultry conveyors for the purpose of feeding empty containers.

This embodiment also provides a measure wherein the empty container is placed from a feed transport element onto the platform.

In the above elucidated coop structure the coops are usually arranged at two levels in order to limit the ground surface area required. Such a coop structure is therefore provided with two poultry conveyors lying one above the other. In order to also enable application of the invention in such situations, a further embodiment provides the measure that the device is also provided with a number of platforms mounted on the frame at a second level lying above the first level, a second discharge transport element mounted on the frame at the second level and extending parallel to the first discharge transport element for the purpose of carrying away containers filled with poultry, which element is situated on the side, facing away from the poultry conveyor, of the platforms located at the second level, second connecting elements extending between the discharge transport elements and each of the platforms for the purpose of transporting containers between the relevant second platform and the second discharge transport element, and a second feed transport element mounted on the frame above the second level and extending parallel to the first transport element for the purpose of supplying empty containers.

This embodiment likewise provides a method of the above elucidated type which is performed at both a first and a second level lying above the first level.

In the above elucidated situation poultry is presented on conveyors at two different levels. The person taking the poultry animals from the conveyor at the first level is standing in most cases on the ground surface. The conveyor at the second level cannot be reached by a person standing on the ground. In order to avoid the use of separate climbing equipment an embodiment proposes the frame be provided with standing platforms for supporting persons transferring the poultry from the end of the poultry conveyors into the containers placed on platforms at the second level.

The containers with and without poultry have to be transported over the transport elements. It is of course possible to make use of driven conveyor belts for this purpose, although in view of the costs involved it is more attractive to make use of roller conveyors. These roller conveyors can be embodied as non-driven conveyor, although it is likewise possible to make use of wholly or partially driven roller conveyors. The containers are moved by hand over the non-driven parts of the roller conveyors.

The above elucidated structures of poultry coops are applied adjacently of each other in large numbers. Since emptying of the coops takes place once every two months, it is not necessary to provide every series of coops with a device according to the invention. According to a preferred embodiment, the frame is provided on its underside with wheels with which the device rests on a ground surface, so that the device can be displaced between the diverse series of coops so that they can be emptied successively.

In order to facilitate the displacement between the head ends of the series of coops the frame is preferably divided into frame sections, the frame sections can be mutually coupled by means of releasable coupling means, each of the frame sections is provided with parts of the transport elements, and the parts of the transport elements of different frame parts connect to each other.

In order to obtain a modular construction of the device, each frame section is preferably provided with at least one platform. Each frame section hereby corresponds to one series of coops.

A cover is preferably placed above the discharge transport element at the second level. This prevents excessive light falling on the poultry animals in the containers and the poultry animals becoming agitated.

In order to facilitate the discharge of the containers with poultry from the second level it is recommended that the device is provided with a downward leading ramp which connects to the second discharge transport element and is received in a separate frame part.

According to another embodiment, at least one of the discharge transport elements is provided with a curve. This curve allows removal of the filled containers to take place at a position other than that at which the empty container is placed on the feed transport elements. This is the case for the discharge transport means at both levels. It is otherwise also possible to provide the discharge transport elements with curves toward opposite sides. According to an alternative embodiment, it is moreover possible for at least one of the discharge transport elements to be provided with a curve. This measure can also apply to the discharge transport means at both levels, wherein it is moreover also possible to provide the discharge transport elements with curves toward opposite sides.

The device is preferably also provided with a casing which extends all around the transport means at a position of the transport means and which is provided with movable closing elements which in their closed position close the casing transversely of the direction of movement of the transport means. By having the position of the casing coincide with an opening in the poultry house the climate in the poultry house remains independent of the surrounding area, while the containers, whether or not filled with poultry, can pass through the opening. The closing elements can be formed by flaps, or by doors which can be opened and closed, optionally automatically, by the container. The invention also relates to a combination of the device according to any of the foregoing claims and a device for housing poultry which is provided with at least one poultry conveyor for transporting poultry.

In order to facilitate taking hold of the poultry it is recommended that the poultry conveyors are provided at their end with a buffer container and that the buffer container is placed in the vicinity of the platforms.

BRIEF DESCRIPTION OF THE DRAWINGS

The present invention will now be elucidated with reference to the accompanying drawings, in which.

DETAILED DESCRIPTION OF THE INVENTION

Figure 1:
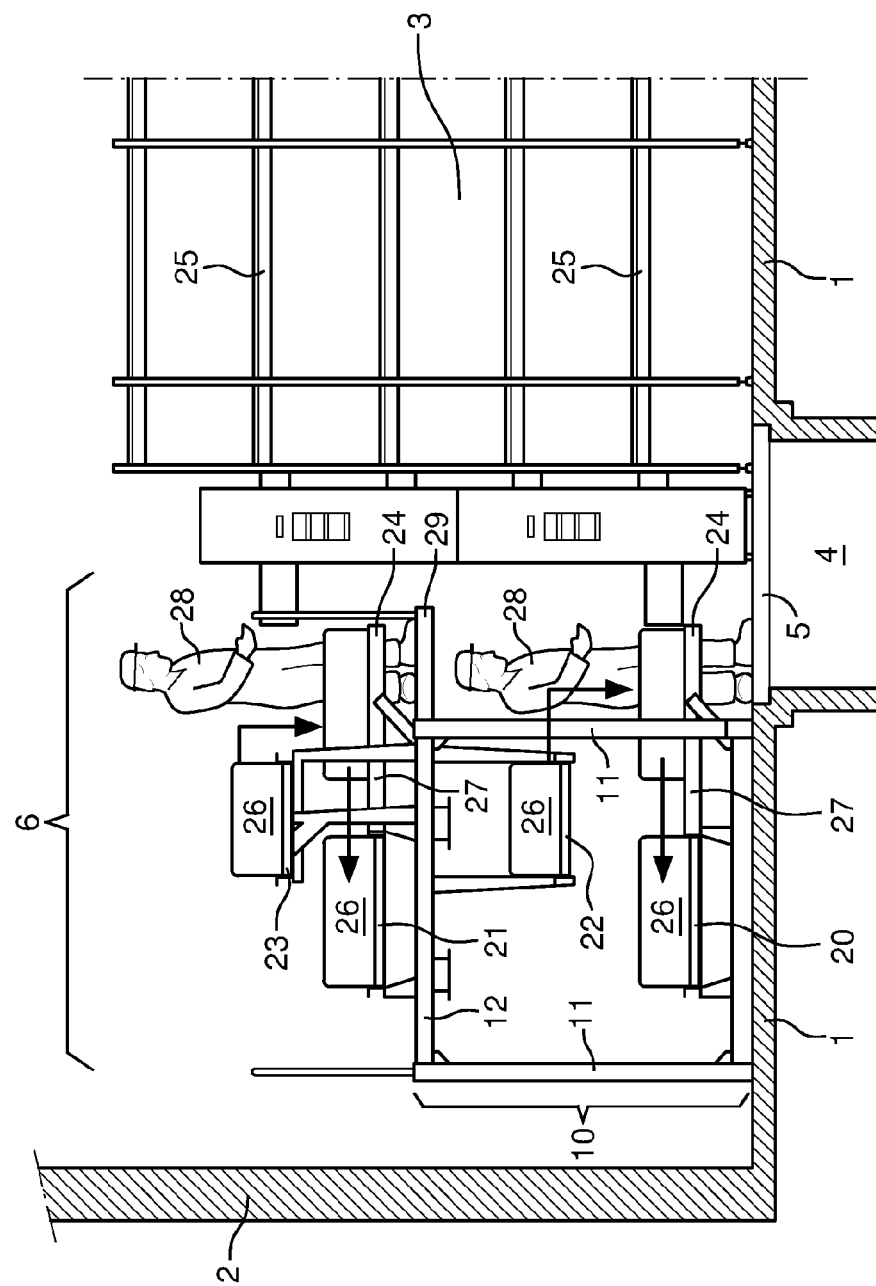
FIG. 1 is a cross-sectional view of an embodiment of the invention.

FIG. 1 shows a ground surface 1 on which the device according to the invention is placed. Ground surface 1 is usually the ground surface of a building which is also provided with walls 2 and a roof (not shown in the drawing). Present in the building is a number of series of poultry coops 3 extending parallel to each other, wherein each series of coops 3 is provided with a manure discharge belt. At the head end of the series of coops 3 a manure gutter 4 is arranged in ground 1 for discharge of the poultry manure supplied by the manure discharge belts. Manure gutter 4 extends substantially transversely of the length direction of the series of coops 3. The manure gutter is closed on its upper side with covers 5 for the purpose of placing the device 6 according to the invention.

The device designated as a whole with 6 comprises a frame which is designated as a whole with 10 and which is provided with vertically extending posts 11, beams 12 extending horizontally in the plane of the drawing and beams 13 extending horizontally transversely of the plane of the drawing and shown only in other figures. Frame 10 can be provided with shores (not shown in the drawing).

Arranged at a first, low level in frame 10 is a first roller conveyor 20 extending in the direction transversely of the plane of the drawing. Also arranged in frame 10 at a second, high level is a second roller conveyor 21 extending parallel to the first roller conveyor 20. Shown in the figure is that first roller conveyor 20 lies under the second roller conveyor, although the two roller conveyors 20, 21 can be offset laterally. A third roller conveyor 22 is arranged at a level slightly higher than that of first roller conveyor 20, and a fourth roller conveyor 23 is placed at a level slightly higher than that of second roller conveyor 21. Third and fourth roller conveyors 22, 23 extend parallel to first and second roller conveyors 20, 21, wherein third roller conveyor 22 is offset to some extent relative to first roller conveyor 20 and fourth roller conveyor 23 is offset to some extent relative to second roller conveyor 21. Arranged on the frame and protruding toward the side of the series of poultry coops 3 is a number of platforms 24, there being at least one platform for each of the manure belts functioning as poultry conveyors 25. The height of the platforms is chosen such that containers in the form of crates 26 placed on the platforms are located at about the same level as poultry conveyors 25 so that the poultry animals can be easily transferred from the poultry conveyor to a crate 26 lying on platform 24. Platforms 24 are connected to respectively the first and second roller conveyor 20, 21 by short roller conveyors 27 extending in the direction of the plane of the drawing and functioning as connecting elements.

The operation of the device will now be elucidated. A person 28 stands on ground surface 1 or on cover 5, or a standing platform 29 arranged especially for the purpose. Empty crates 26 are fed on the respective third or fourth roller conveyor 22, 23. The respective person takes a crate 26 from the third or the fourth roller conveyor 22, 23 and places crate 26 on the respective platform 24. The poultry conveyors are then switched on so that poultry animals are supplied, which are placed into crate 26 on the respective platforms 24 by persons 30. Once sufficient poultry animals have been placed in the crate, crates 26 are moved via short roller conveyors 27 onto the first or second roller conveyor 20, 21, after which a new crate is taken from the third or fourth roller conveyor and placed on the platforms, and this crate is also filled with poultry.

Figure 2:
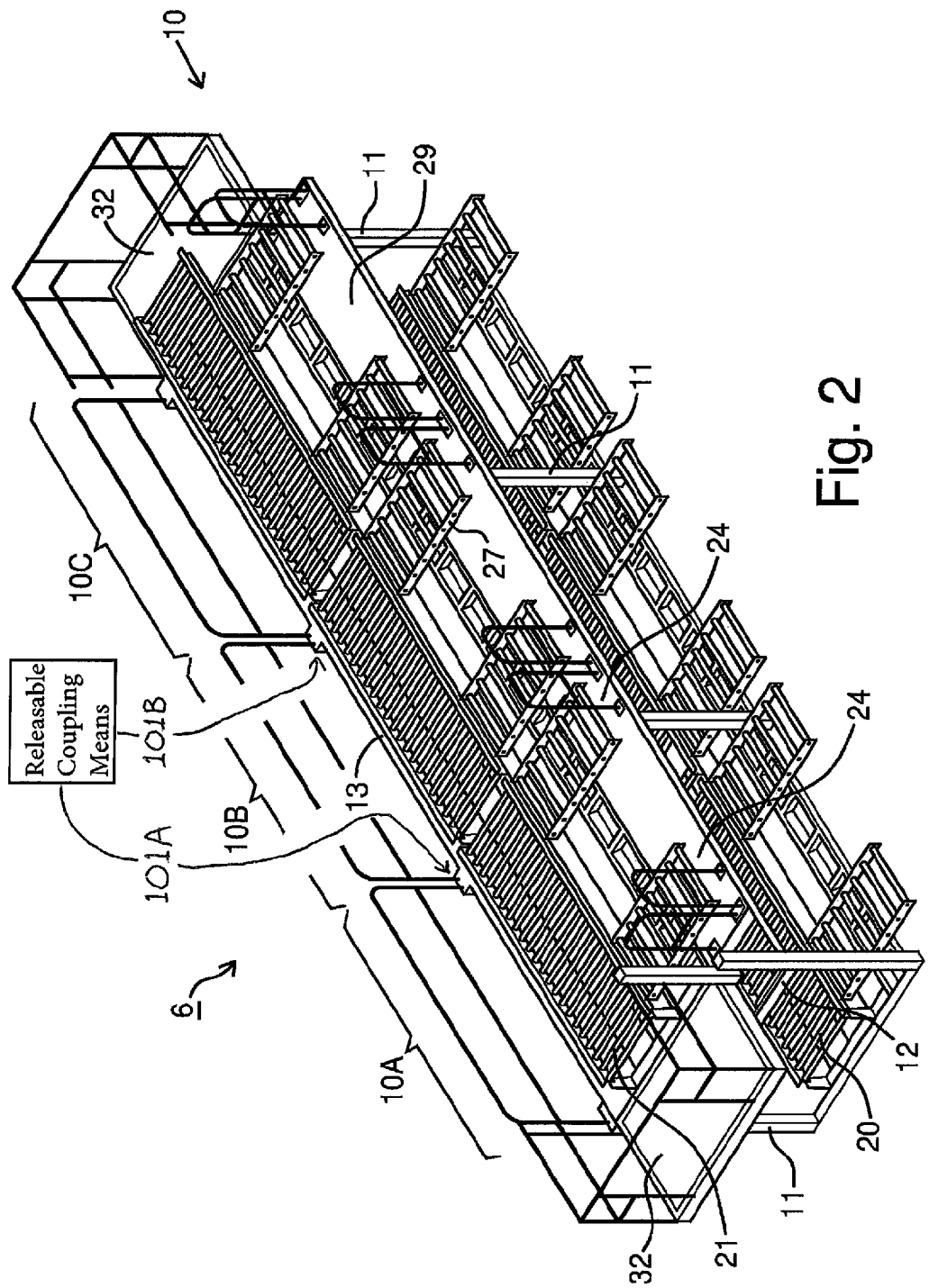
FIG. 2 is a schematic perspective view of a part of the device according to the invention.

In the embodiment shown in FIG. 2 the device according to the invention is divided into three segments 30A, 30B and 30C. Each of these segments 30A, 30B and 30C comprises a frame section 10A, 10B and 10C. Frame sections 10A-C are mutually connected by means of connecting means, which may be releasable coupling means 101A, 101B. Roller conveyors 20, 21, 22 and 23 are also each divided into three sections of roller conveyor, respectively 20A-C, 21A-C, 22A0C and 23A-C, each situated in one of the frame sections 10A-C. The section of roller conveyor connect in each case to each other.

This figure also shows that a standing platform 29 extends over the whole length of the device and is likewise divided into segments. It is noted that standing platform 29 being formed by a plurality of sections of standing platform placed at a mutual distance from each other is not precluded, although to increase safety it is recommended to apply only a single standing platform 29 which extends over the whole length of the device so that falls caused by stepping off standing platform 29 are prevented as far as possible. Since the series of poultry coops 3 are usually placed in pairs, the poultry conveyors are then likewise located close together, so that the platforms are preferably configured for pairwise 'servicing' of the poultry conveyors. Each of the segments is provided for this purpose with two platforms 24 so that the segments have the same layout as the poultry conveyors. In the embodiment shown in FIG. 2 the platforms are integrated with the short roller conveyors functioning as connecting elements, whereby the crates no longer have to be moved from the platform to the short roller conveyor.

FIG. 2 otherwise also shows that the device is provided with decks 32 placed on the second level at the end and the beginning of the device. These decks can be used to store empty and filled containers.

Figure 3:
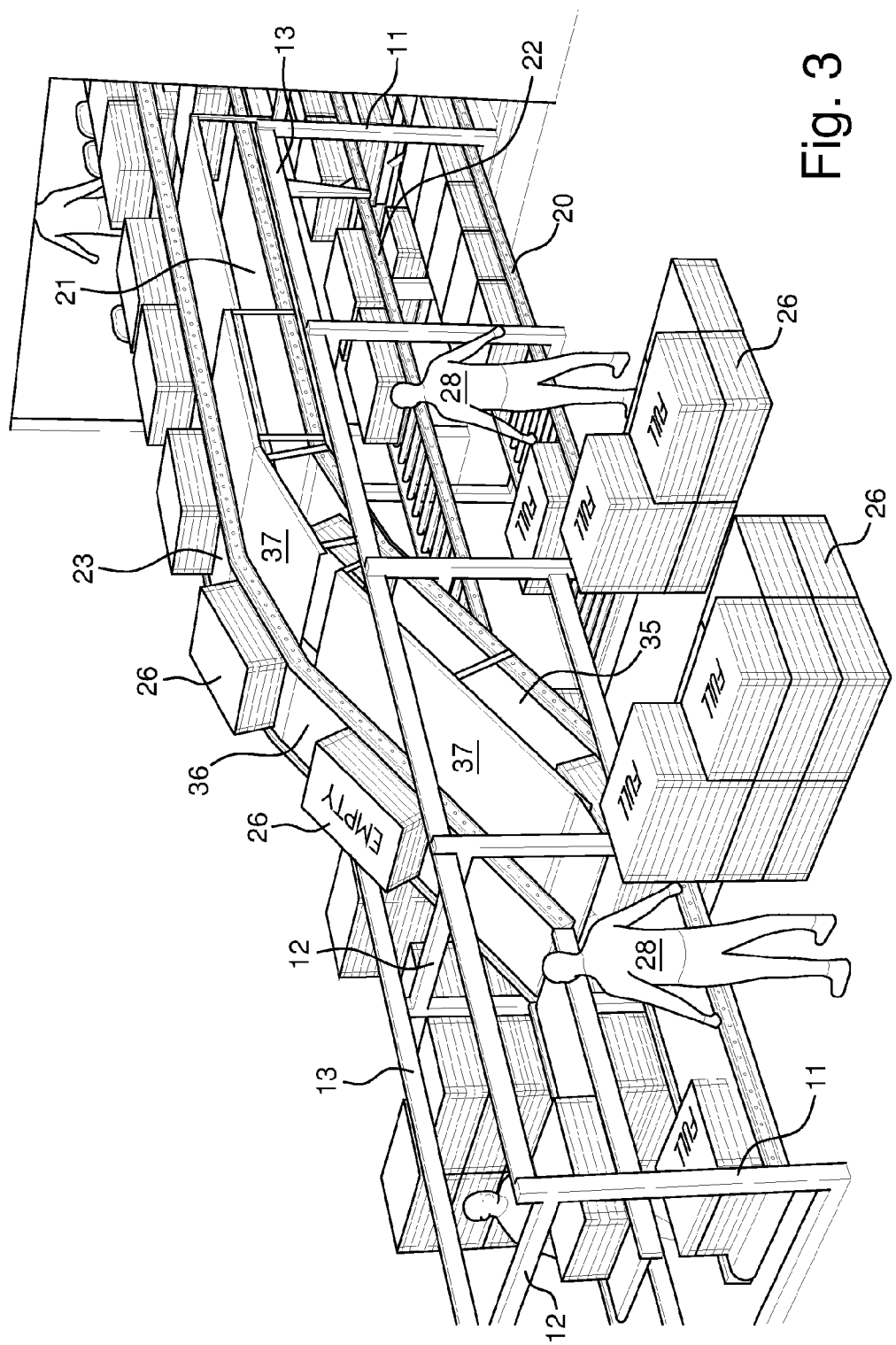
FIG. 3 is a schematic view of a ramp as part of a device according to the invention.

FIG. 3 shows how an upward inclining ramp 35 is placed connecting to the fourth roller conveyor in order to carry empty containers to the fourth roller conveyor at the second level. Although this is not shown in the drawings, a corresponding descending ramp 36 is placed connecting to the second roller conveyor for feeding containers filled with poultry back to the first level. The two ramps 35, 36 are preferably embodied as roller conveyor, wherein the ascending ramp 35 can be provided with driven rollers and the descending ramp 36 can be provided with braked rollers. FIG. 3 further shows how a covering in the form of a cover 37 is arranged above the second roller conveyor and the descending ramp 35. The poultry present in the containers is hereby kept in low light, this enhancing the calmness of these animals.

Figure 4:
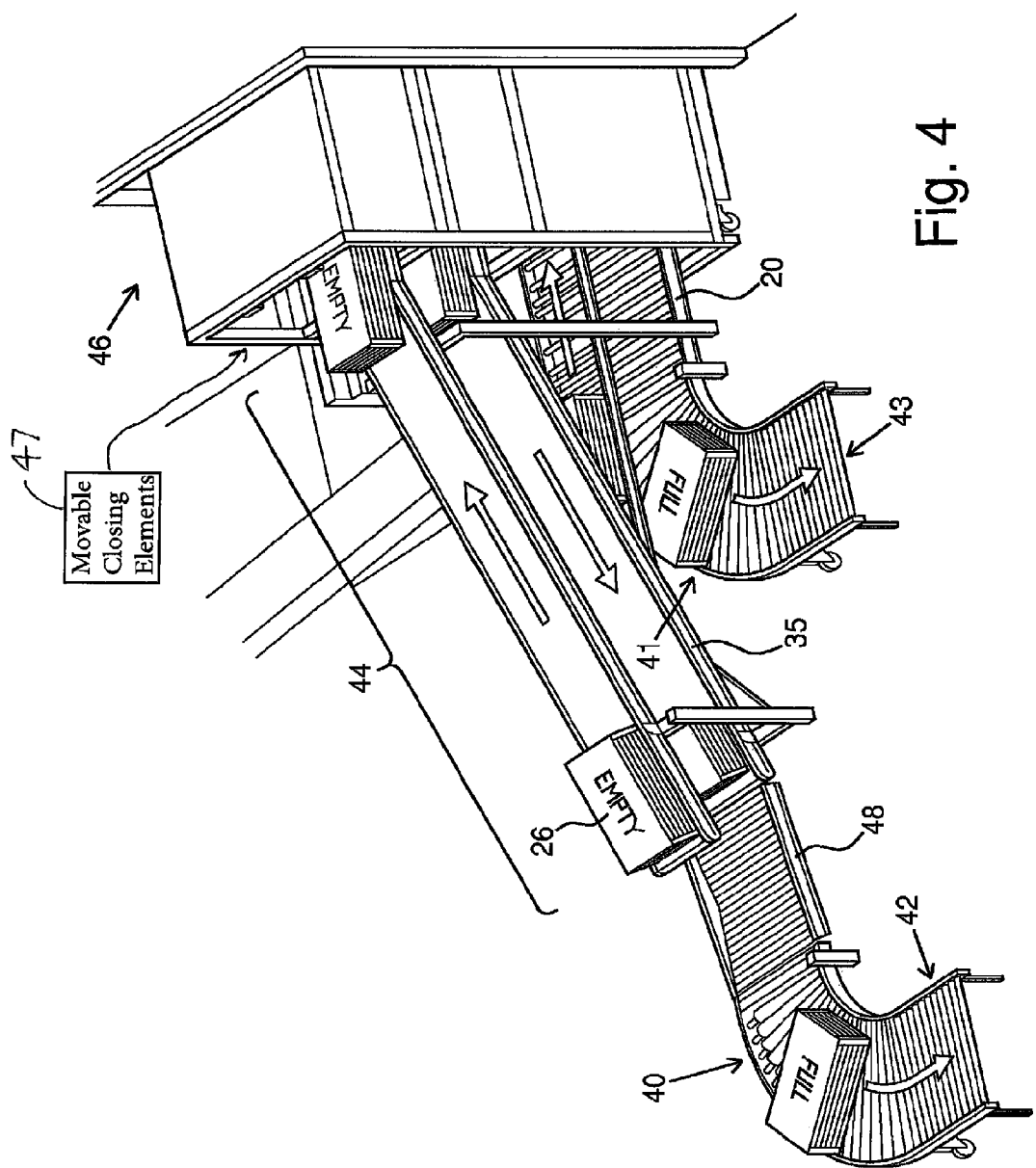
FIG. 4 is a schematic perspective view of a variant of the device shown in FIGS. 1, 2 and 3.
Figure 5:
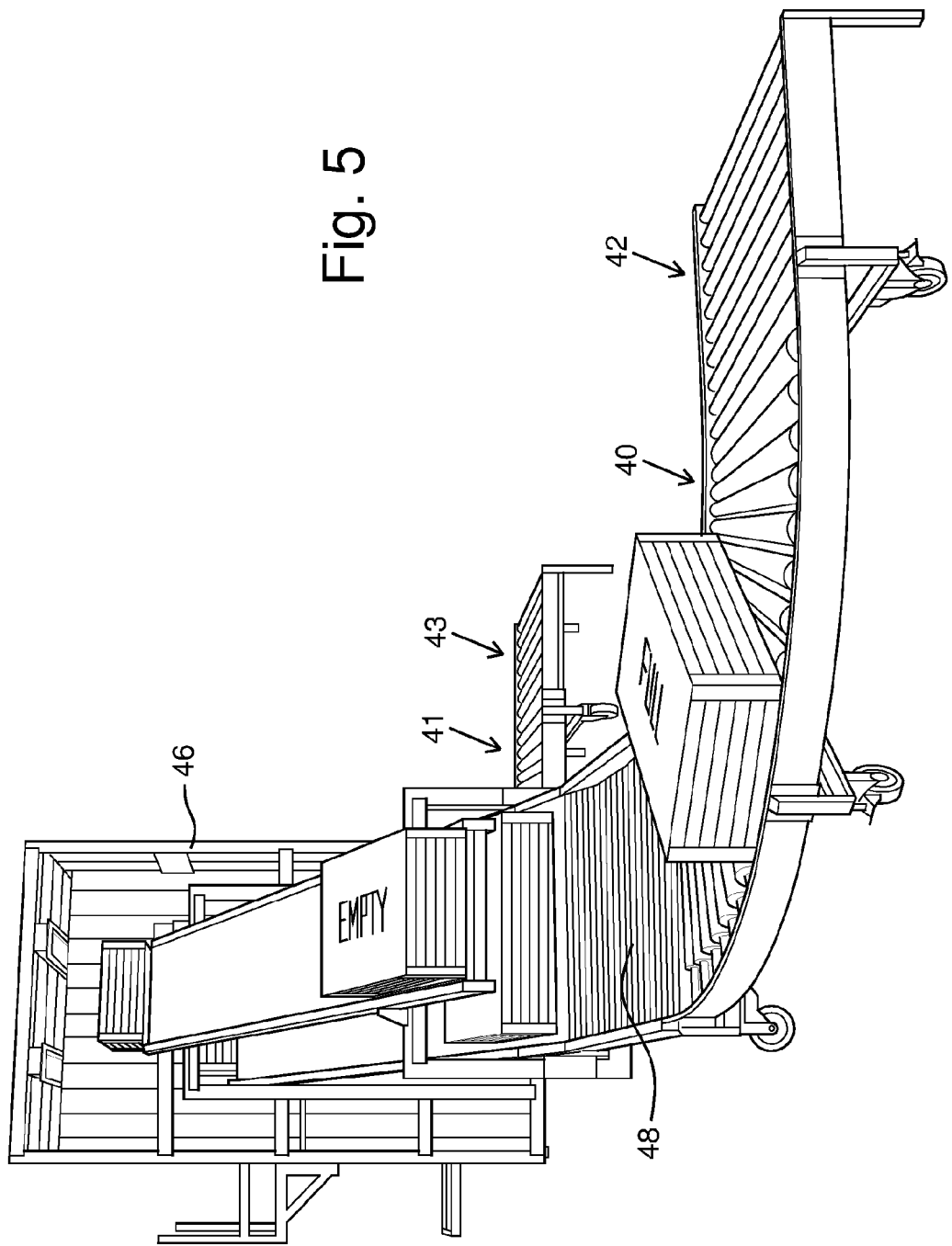
FIG. 5 is a view corresponding to FIG. 4 from a different direction.

A subsequent embodiment is elucidated below with reference to FIGS. 4 and 5. In this embodiment roller conveyors 20 and 21, which are configured to carry away the containers filled with poultry, connect to curved sections of roller conveyor 40, 41. These curved sections of roller conveyor 40, 41 make it considerably easier in ergonomic terms for the persons removing filled containers 26 from roller conveyors 20, 21 to take hold of the filled containers, since they can grip the containers from a convenient position. Short sections of straight roller conveyor 42, 43 connect to the curved sections of roller conveyor 40, 41. This is in principle also possible with short sections of roller conveyor connecting to roller conveyors 20, 21 and extending transversely of main roller conveyors 20, 21, although this configuration would result in a sudden change in direction of the containers filled with poultry, which is perceived as unpleasant by the poultry. A right-angled transmission without drive further creates a high risk of jamming or not rolling on.

Already elucidated in the above is that the device according to the invention is assembled from parts. These parts make it possible to take the device apart into components, which facilitates transport. It is noted here that the device is applied only when the poultry is being taken away from a house, which is the case only a limited part of the time. By making the device easy to transport it can also be applied in other houses and even for transport by truck from farm to farm on the public highway, so that it can be used more economically. This is also the case for the above elucidated curved sections of roller conveyor 40, 41 and the short sections of roller conveyor 42, 43 connecting thereto. These preferably form a separate part, possibly in combination with their support frame. A particularly attractive embodiment results when the curved sections of roller conveyor 40, 41 take a symmetrical form. Depending on the relevant situation on site, they can here be placed on both sides of the longitudinal axis of the device. The paths of crate infeed and outfeed are likewise placed symmetrically one above the other relative to the central longitudinal plane so that both the sluice unit and the outfeed unit can be placed on both sides of the house.

It can also be attractive for the transportability to embody the device at least partially such that it can be transported on a truck or such that it can be transported as a trailer behind a truck. It is attractive here to divide the main frame into sections in the length direction. A part preferably comprises the inclining conveyor belts and the associated frame. It is thus possible to construct frame part 44, in which the inclining parts of the roller conveyors are accommodated, as a single transportable part. The part 45 connecting thereto, which is placed in the passage of the house, can also be embodied as a single part. It is also attractive for the individual parts to be provided with channels which can be engaged by the prongs of a forklift truck to enable movement of the parts onto and off a truck.

The device is preferably placed during use in a passageway or gateway in a house wall. The part of the device configured to fill the crates is preferably situated in the house, where the poultry is after all located, and the part of the house where the empty crates are placed and the full crates are removed is preferably situated outside the house, with a view to the supply and discharge of the crates. There is usually a great difference in temperature and humidity between the space inside the house and outside it. This is because temperature and humidity in the house are optimized for the poultry. The passage in the house wall may result in a change in the climate in the house, which may result in excessive loading of the climate control or, in the worst case, in death of the poultry. In order to reduce this drawback use is preferably made of flaps which close the passage for the greater part and which open only when a crate passes through the opening. Use can also be made of controllable sliding doors instead of flaps. It is also possible for the flaps to be mounted on slidable parts of a door. Nor is the use of an air curtain precluded. A part 45 of the frame and the conveyors is preferably placed in a casing 46 on which movable closing elements 47, such as flaps, sliding doors, or other types of doors are mounted. This part 45 of the frame is then placed together with the casing in the passage, wherein the space in the passage not taken up by the casing is closed. A separation between the space inside the house and the surrounding area is hereby obtained.

The roller conveyors are preferably provided with inclining parts 48. The transition between the inclining parts of the roller conveyors and the horizontal parts thereof are preferably provided with curved parts 48 which make the movement made by the crates on the roller conveyors as gradual as possible during the change in direction in the vertical plane. The curved parts preferably connect smoothly to the connecting parts of the roller conveyor. Sliding strips are otherwise fixed between these rollers so that the crate does not butt against a side of the roller.

It will be apparent that the above elucidated embodiments can be combined within the scope of the invention as defined by the appended claims.

The invention claimed is:

1. A device for facilitating the placing of poultry animals in containers, wherein the poultry animals are supplied on at least one poultry conveyor, wherein the device comprises:
   a frame;
   a number of first platforms mounted on the frame and extending horizontally at a first level for the purpose of carrying a container for each of the poultry conveyors, wherein each first platform is located in the vicinity of the end of a poultry conveyor;
   at least a first discharge transport element mounted on the frame at the first level and extending transversely of the poultry conveyors in the operative position of the device for the purpose of carrying away containers filled with poultry, which element is situated on the side of the platforms facing away from the poultry conveyor; and
   first connecting elements extending between the first discharge transport element and each of the first platforms and mounted on the frame for the purpose of transporting containers filled with poultry between the relevant platform and the discharge transport element.

2. The device as claimed in claim 1, wherein a feed transport element is mounted on the frame above the first level and extending transversely of the poultry conveyors for the purpose of feeding empty containers.

3. The device as claimed in claim 2, wherein the device comprises:
   a number of platforms mounted on the frame at a second level lying above the first level;
   a second discharge transport element mounted on the frame at the second level and extending parallel to the first discharge transport element for the purpose of carrying away containers filled with poultry, which element is situated on the side, facing away from the poultry conveyor, of the platforms located at the second level;
   second connecting elements extending between the discharge transport elements and each of the platforms for the purpose of transporting containers between the relevant second platform and the second discharge transport element; and
   a second feed transport element mounted on the frame above the second level and extending parallel to the first transport element for the purpose of supplying empty containers.

4. The device as claimed in claim 3, wherein the frame is provided with standing platforms for supporting persons transferring the poultry from the end of the poultry conveyors into the containers placed on platforms at the second level.

5. The device as claimed in claim 1, wherein the transport elements comprise roller conveyors.

6. The device as claimed in claim 1, wherein the frame is provided on its underside with wheels with which the device rests on a ground surface.

7. The device as claimed in claim 6, wherein the frame is divided into frame sections, that the frame sections can be mutually coupled by means of releasable coupling means, that each of the frame sections is provided with parts of the transport elements, and that the parts of the transport elements of different frame parts connect to each other.

8. The device as claimed in claim 7, wherein each frame section is provided with at least one platform.

9. The device as claimed in claim 7, wherein a cover is placed above the discharge transport element at a second level.

10. The device as claimed in claim 7, wherein the device is provided with a downward leading ramp which connects to a second discharge transport element and is received in a separate frame part.

11. The device as claimed in claim 1, wherein at least one of the discharge transport elements is provided with a curve.

12. The device as claimed in claim 1, wherein the device is provided with a casing which extends all around a transport means at a position of the transport means and which is provided with movable closing elements which in their closed position close the casing transversely of the direction of movement of the transport means.

13. Combination of a device as claimed in claim 1 and a device for housing poultry which is provided with at least one poultry conveyor for transporting poultry.

14. Combination as claimed in claim 13, wherein the poultry conveyors are provided at their end with a buffer container and that the buffer container is placed in the vicinity of the platforms.

15. A method for placing poultry animals supplied on at least one poultry conveyor into containers, wherein the method comprises the following steps of:
   placing an empty container, in which a number of poultry animals have to be placed, on a platform mounted in the vicinity of the poultry conveyor;
   removing the number of poultry animals from the poultry conveyor and placing these poultry animals into the container;
   displacing the container filled with poultry animals over a connecting element onto a discharge transport element; and
   moving the container filled with poultry animals over the discharge transport element to an unloading station in a direction extending substantially perpendicularly of the direction in which the container is moved over the connecting element.

16. The method as claimed in claim 15, wherein the empty container is placed from a feed transport element onto the platform.

17. The method as claimed in claim 15, wherein the empty container is placed onto the platform in a movement with a vertical component.

18. The method as claimed in claim 15, wherein the method is performed at a first level and at a second level lying above the first level.

* * * * *